(12) United States Patent
North et al.

(10) Patent No.: US 9,068,815 B1
(45) Date of Patent: Jun. 30, 2015

(54) POSITION SENSORS AND METHODS

(75) Inventors: Christopher C. North, Woodland Park, CO (US); Jeffrey A. Stewart, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 800 days.

(21) Appl. No.: 13/292,993

(22) Filed: Nov. 9, 2011

(51) Int. Cl.
*G01B 7/14* (2006.01)
*G01B 7/30* (2006.01)
*H01F 5/00* (2006.01)

(52) U.S. Cl.
CPC .... *G01B 7/14* (2013.01); *H01F 5/00* (2013.01)

(58) Field of Classification Search
CPC ............... G01B 7/14; G01B 7/30; H01F 5/00
USPC ............. 324/207.16, 207.11, 207.12, 207.24, 324/207.23, 207.15, 207.17, 207.26
See application file for complete search history.

(56) References Cited

U.S. PATENT DOCUMENTS

| | | | | |
|---|---|---|---|---|
| 2,314,291 A * | 3/1943 | Taylor | ............................. | 335/125 |
| 3,243,013 A * | 3/1966 | Molin et al. | ..................... | 184/14 |
| 4,266,466 A * | 5/1981 | Ziems | ............................. | 91/420 |
| 4,339,709 A * | 7/1982 | Brihier | ............................. | 324/725 |
| 5,218,308 A * | 6/1993 | Bosebeck et al. | ............. | 324/654 |
| 5,438,261 A * | 8/1995 | Codina et al. | ............. | 324/207.16 |
| 5,769,043 A * | 6/1998 | Nitkiewicz | .................. | 123/90.11 |
| 6,012,644 A * | 1/2000 | Sturman et al. | ................... | 239/96 |
| 6,518,748 B2 * | 2/2003 | Butzmann et al. | ........ | 324/207.16 |
| 6,577,133 B1 * | 6/2003 | Barron | ........................... | 324/415 |
| 6,819,208 B1 * | 11/2004 | Peghaire et al. | ............... | 335/256 |
| 7,032,549 B1 | 4/2006 | Verner et al. | | |
| 7,121,300 B2 * | 10/2006 | Kragl et al. | .................... | 137/554 |
| 7,271,582 B2 * | 9/2007 | Proksch et al. | ........... | 324/207.18 |
| 7,816,911 B2 | 10/2010 | Taylor et al. | | |
| 2003/0102862 A1* | 6/2003 | Goto et al. | ................ | 324/207.16 |
| 2005/0046415 A1* | 3/2005 | Kato et al. | ................ | 324/207.24 |
| 2006/0207421 A1* | 9/2006 | Muller | .............................. | 92/31 |
| 2007/0001354 A1* | 1/2007 | Stothers et al. | ................ | 267/136 |
| 2010/0288238 A1* | 11/2010 | Beilharz et al. | ................ | 123/480 |
| 2011/0083643 A1 | 4/2011 | Sturman et al. | | |
| 2013/0147467 A1* | 6/2013 | Engel et al. | .............. | 324/207.12 |

* cited by examiner

*Primary Examiner* — Patrick Assouad
*Assistant Examiner* — Lamarr Brown
(74) *Attorney, Agent, or Firm* — Blakely Sokoloff Taylor & Zafman LLP

(57) ABSTRACT

Position sensors and methods having a coil, a magnetic target movable into greater and lesser proximity to the coil responsive to the position to be sensed, and circuitry responsive to an inductance of the coil to provided a measure of the proximity of the magnetic target to the coil. Various embodiments are disclosed, including embodiments having improved sensitivity and shielding from stray fields and for shielding from magnetic fields generated by the coil excitation.

14 Claims, 7 Drawing Sheets

POSITION SENSORS AND METHODS

BACKGROUND OF THE INVENTION

1. Field of the Invention

The present invention relates to the field of position sensors and methods, and more particularly to position sensors and methods suitable for sensing and measuring substantial movement.

2. Prior Art

Position sensors and methods are well known in the prior art. Many of these sensors and methods are particularly applicable to instrumentation where the amount of motion or deflection is measured in thousands of an inch or less. There are, however, a number of applications wherein it is desired to measure position of a mechanical element throughout a range of motion of a substantial fraction of an inch or even a number of inches where the environment is less than ideal for a physically sensitive sensor and the mechanical requirements of the assembly cannot be substantially compromised or altered to accommodate the inclusion of the sensor. Such applications include the measurement of lift in internal combustion engine valves wherein the lift is electronically controlled, whether electro-hydraulically, electromagnetically or otherwise. Another application is in free piston engines such as that disclosed in U.S. Patent Application Publication No. US-2011-0083643-A1 entitled "Hydraulic Internal Combustion Engines". In these applications, position as well as velocity are preferably measured, though velocity may be determined by the time and position difference between two successive position sensings.

U.S. Pat. No. 7,032,549 discloses a valve lift sensor for sensing lift in an internal combustion engine. That sensor uses a conductive target fastened to the engine valve stem that surrounds a coil fixed to the cylinder head. The coil is in series with a resistor with a signal generator energizing the coil with an oscillating voltage to create an oscillating magnetic field concentric to the coil. The oscillating magnetic field induces Eddy currents in the target, which in turn creates reactive magnetic fields. It is stated that "These increase in strength as the valve is opened and the target engages more of the coil magnetic field so that the eddy currents increase and a greater phase shift results between voltage of the signal generator and the current in the coil and the resistor." "The reactive fields of the Eddy currents affect current flow through the coil by creating a lag in the current phase of the coil 36 and the resistor 38 relative to the phase of the voltage supplied by the signal generator 34". This phase lag is sensed by a comparator which provides an exclusive OR output signal. "The Exclusive OR output signal is determined according to the following logic. When the state of the signal generator voltage and the resistor voltage are the same, the output signal is "Low", as illustrated by portions 56 of line 50. However, when the state of the signal generator voltage and the resistor voltage are different, a "High" output signal is generated, as illustrated by portions 52 and 54 of line 50, until the states become the same. Thus, the duty cycle (or width) of the output signals 52, 54 is proportional to the response delay (phase lag) of the resistor voltage, which is proportional to valve lift."

In the foregoing patent the signal generator voltage is a square wave and the phase lag is sensed at the leading edge and trailing edge of the square wave pulses with a voltage equal to one-half the amplitude of the square wave being taken as the dividing line between the states.

It is not clear how well the above described sensor would operate, or even how it operates. In particular, as the conductive target is lowered around the coil as the engine valve opens, the Eddy currents in the conductive target tend to confine the magnetic field caused by current in the coil, thereby reducing its inductance. At the same time, the Eddy currents increase the apparent resistance of the coil so that the overall effect is to reduce the time constant of the coil, yet it is stated in the patent that the duty cycle or width of the output signals is proportional to the response delay of the resistor voltage which is proportional to valve lift. That duty cycle, as shown in FIG. 3, is a measure of the time constant of the circuit, which would seem to decrease with increasing lift.

In any event, a thin conductive target as shown could be easily damaged during assembly of the engine or by inadvertent contact with hand tools during a repair. Also, while measuring lift on the leading and trailing edge of the square wave excitation has certain advantages, it also has a strong disadvantage. In particular, if the sensing point is not exactly midway between the upper and lower bounds of the square wave excitation, such as by drift of either or both voltages, there will be difference in lift measurement between leading edge measurements and trailing edge measurements. While this difference could be averaged out, two successive readings would need to be taken and then the midpoint between the two readings determined, not easily done and delaying the position determination.

DETAILED DESCRIPTION OF THE PREFERRED EMBODIMENTS

Figure 1A:
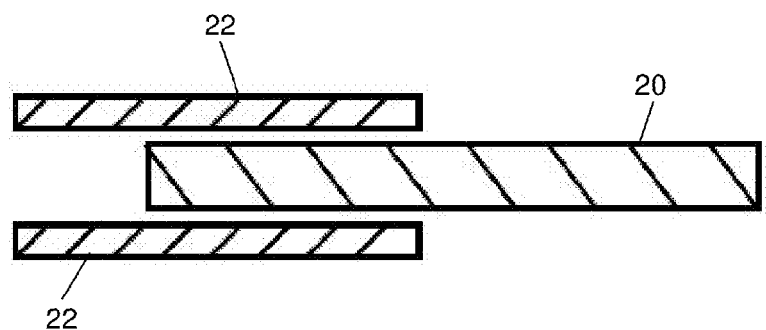
FIGS. 1a and 1b illustrate two exemplary configurations of the present invention.
Figure 1B:
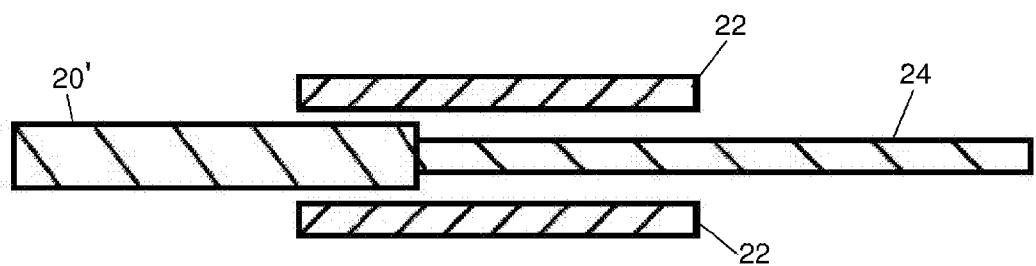

First referring to FIGS. 1a and 1b, two exemplary configurations of the present invention may be seen. In FIG. 1a a magnetic (ferrous) pin 20 is coupled to an element for which the motion is to be measured, and is positioned to be moved back and forth within coil 22 responsive to that motion. The magnetic pin 20 typically is a ferrous pin, which may be a reasonably soft magnetic material such as 1020 steel or a harder steel such as 52100. Thus movement of the magnetic pin 20 within coil 22 changes the inductance of the coil, which as shall subsequently be seen, is the key variable to be sensed. In FIG. 1b a similar configuration is shown, though the magnetic pin 20' is on the end of another pin 24 (not necessarily smaller than the magnetic pin 20') which is non-magnetic.

Figure 2:
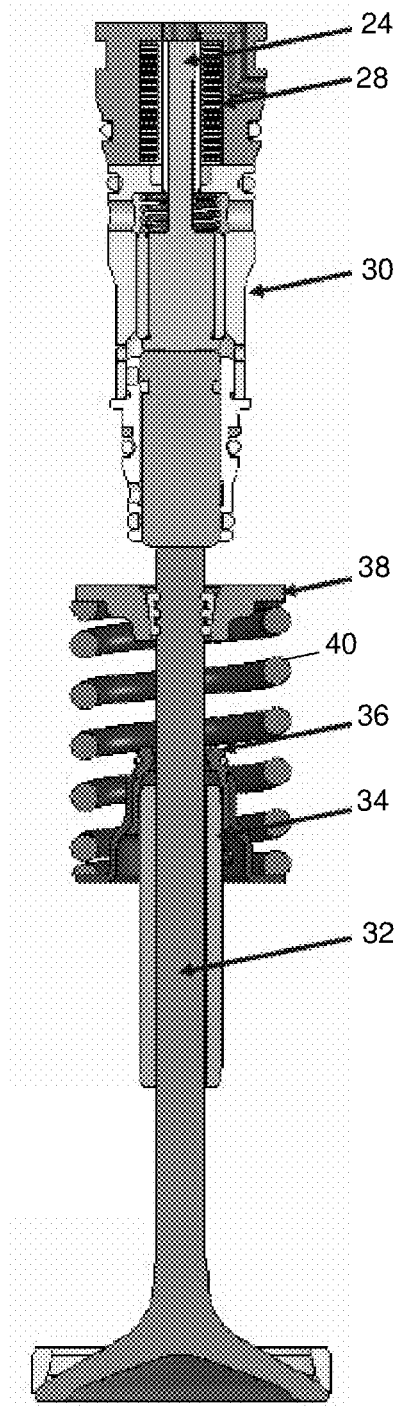
FIG. 2 illustrates an example of the present invention being used for sensing engine valve lift.

A specific configuration of the present invention is shown in a valve lift sensing application in FIG. 2. Here the magnetic pin 24 and the sensor coil 28 are positioned at the top of the engine valve assembly with a hydraulic valve actuator assembly 30 therebelow which acts on the end of the valve stem 32 guided within valve guide 34, with a valve seal 36 and a valve spring retainer 38 retaining valve spring 40. Thus the magnetic pin 24 and sensor coil 28, as well as the hydraulic valve actuator 30, may be in a separate housing which may be a bolt-on assembly, as the engine valve assembly itself may be of conventional design and in fact might be a part of a preexisting engine or at least a preexisting design being converted to camless operation. In a free piston engine, a magnetic pin would either be fastened to or configured to follow the motion of the free piston and slide within an elongated coil to provide the sensor structure. In this case, the stroke of the free piston may be on the order of four inches, and accordingly, the coil itself as well as the pin would be of similar, perhaps slightly greater, length.

Figure 3:
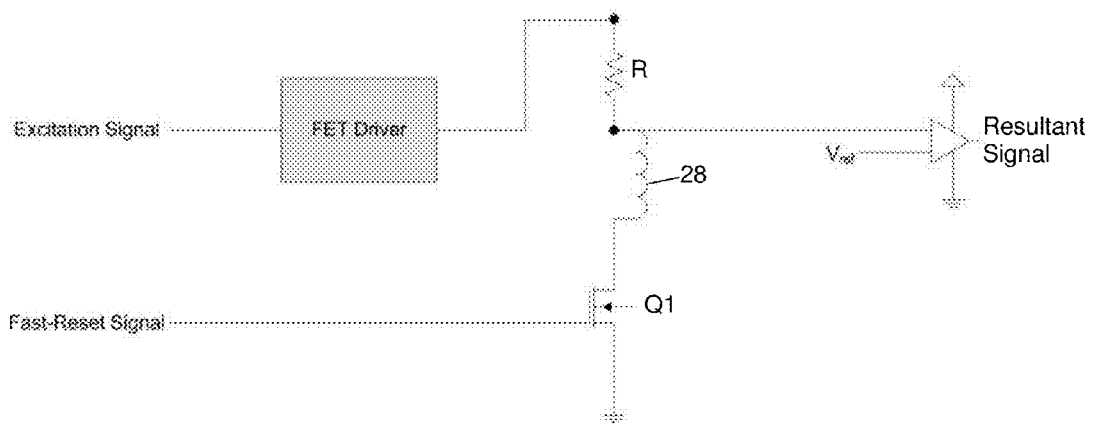
FIG. 3 is a schematic illustration of a sensing circuit for the sensor of the present invention.
Figure 4:
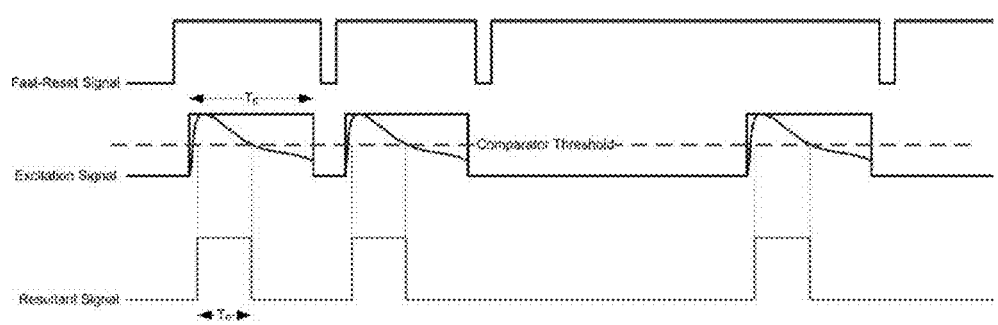
FIG. 4 presents exemplary waveforms for the operation of the present invention.

Now referring to FIGS. 3 and 4, an exemplary circuit for driving the sensor coil 28 and the associated signal waveforms may be seen. When the Fast Reset Signal is low, transistor Q1 is off, so the current in the series connection of the sensor coil 28 and the resistor R is zero. When the Fast Reset goes high, transistor Q1 is turned on, though the current in the series connection of the sensor coil 28 and the resistor R remains zero because the Excitation Signal and the output of the FET Driver is low. When the Excitation Signal and output of the FET Driver go high, a fixed voltage is coupled to the series connection of the sensor coil 28 and resistor R. Now the current in the series connection of the sensor coil 28 and resistor R starts increasing from zero, with the Excitation Signal voltage first appearing across the sensor coil 28, but decreasing as the current increases and thus the voltage drop across the resistor increases. As the voltage across the sensor coil 28 decays, at some point it will cross the Comparator Threshold. The Comparator is triggered by the rise in the voltage across the sensor coil 28, and again by the voltage across the coil decaying to below the Comparator Threshold, providing an output pulse $T_R$ long. There are, of course, some Eddy current losses in the pin 24 (FIG. 2), though these are relatively small. In a preferred embodiment, the excitation signal is maintained for a time period $T_e$, after which the excitation signal goes low, followed by the Fast Reset Signal going low, turning off transistor Q1. This causes a very rapid collapse of the magnetic field in the sensor coil 28 because of the resulting high back EMF caused by the sudden open circuit, the back EMF being limited only by the voltage across the Zener diode commonly included in such field effect transistors (not shown). Because of this, the Fast Reset Signal and the Excitation Signal may soon thereafter be driven high again to repeat the sensing cycle. Thus in comparison to the prior art, the present invention depends on the magnetic field coupled to the pin as opposed to Eddy currents in the pin caused by magnetic fields therethrough. Also in comparison to the prior art, for a fixed position of the pin 24 in the sensor coil 28, the present invention provides a stable output for each Excitation Signal, in spite of a possible error in the reference voltage Vref, typically, but not necessarily, set at approximately one half of the Excitation Signal voltage. The prior art, on the other hand, will provide alternating higher and lower signals with a separation of twice the error in the reference voltage, which will definitely cause noise in the system and could lead to instabilities. Another advantage of the present invention is that such sensors may be used to balance or equalize the motion in multiple elements. By way of example, in the engine valve example of FIG. 2 it is desirable in multicylinder engines that valve lift for each cylinder be equal. This can easily be done with the present invention by merely providing the same reference voltage Vref for all such sensors. Finally, if desired, the Fast Reset Signal and the Excitation Signal could be triggered low at or just after the trailing edge of the Resultant Signal for substantially immediate repeat of the operating cycle to obtain an even higher frequency of sensing, particularly when the inductance of the sensor coil 28 is low (such as when pin 24 has withdrawn most of the way through sensor coil 28). Since the inductance is essentially proportional to the position of the pin within the coil, the pulse width $T_r$ of the resultant signal is substantially a linear measure of the pin position within the coil. In a typical application the pulse width $T_r$ of the resultant signal would be converted to a digital signal and if better linearization is required, any output signal could be corrected by an appropriate lookup table and interpolation between points. In that regard, a slight delay in the effective triggering of the Comparator on the Excitation Signal going high has been found to improve the linearity of the sensor, which delay may be imposed in the analog domain or in the digital domain. Also any zero offset can be cancelled, either initially, or repeatedly when the position sensor is in a known position, such as in hydraulic or other engine valve actuation systems, when the valve is known to be closed. In an engine valve actuation system, this has the advantage of being able to cancel any changes in zero offset faster than changes in zero offset can accumulate because of such effects as differential expansion, thermal expansion and wear. Also one can measure the temperature of the sensor coil 28 by momentarily interrupting the position measurement to pass a known current through the sensor coil 28 and measure the voltage across the sensor coil 28 to determine its resistance and hence its temperature. Note that by definition, a fixed current through the sensor coil 28 eliminates the effect of its inductance, so the voltage drop across the sensor coil 28 is entirely due to its resistance. If possible, the temperature measurement can be done while the sensor pin 24 is in a fixed position, such as in a hydraulic engine valve actuation system, sometime while the engine valve is closed, as the pin position need only be measured once (or a few times) when in the known position for correcting the zero offset.

Figure 5A:
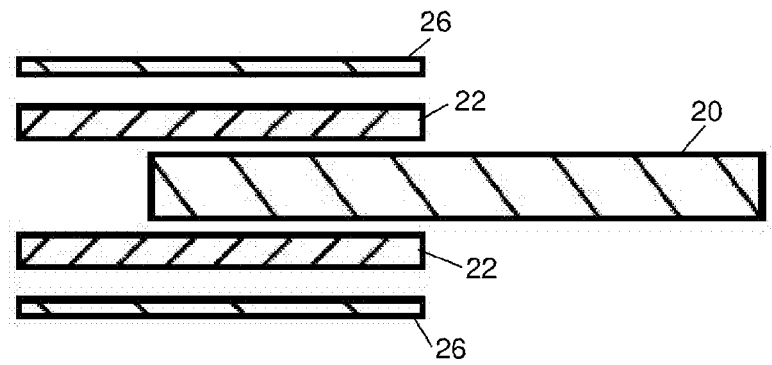
FIGS. 5a through 5c are cross sections of alternate embodiments of the present invention.
Figure 5B:
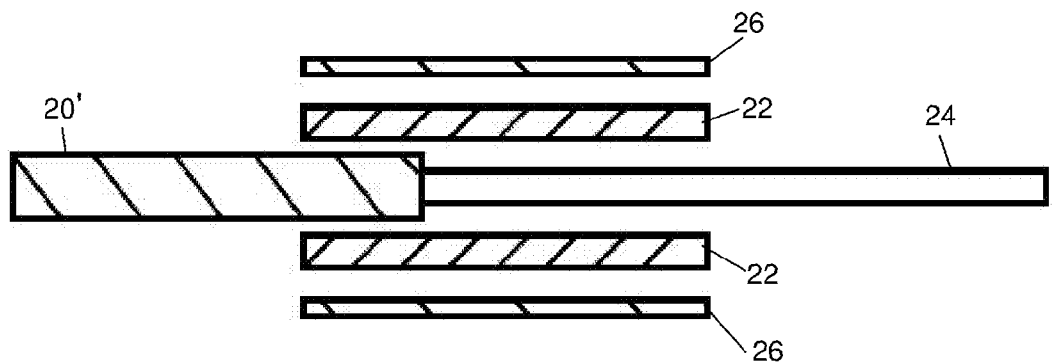
Figure 5C:
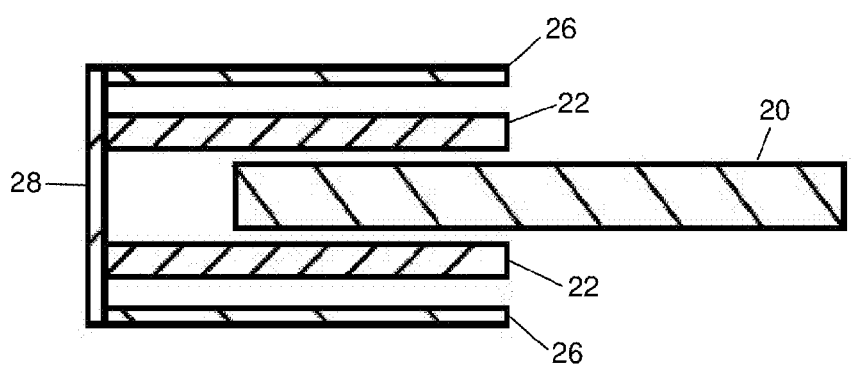

Now referring to FIGS. 5a through 5c, cross sections of alternate embodiments of the present invention may be seen. FIG. 5a shows the embodiment of FIG. 1a with a further ferrous metal member 26 substantially encircling the coil 22 and target 20. The purpose of the ferrous member 26 is primarily to confine the magnetic field generated by the coil 22, which otherwise may cause noise in any adjacent circuitry, and to avoid interference from external fields. The presence of a full circular ferrous member 26 has been found to actually decrease the sensitivity of the sensor, though the placement of a small longitudinal slot in the otherwise circular ferrous member 26 actually increased the sensitivity of the sensor by eliminating or substantially reducing the Eddy currents generated in the ferrous member 26 and by providing a more complete magnetic circuit with the magnetic pin 20. In the embodiments disclosed herein, the magnetic pins are generally circular rods, the coil and the ferrous metal member substantially encircling the coil and target are generally tubular in cross section having circular inner and outer diameters, though this is not a limitation of the invention.

FIG. 5b is similar to FIG. 1b but also further incorporates the ferrous metal member 26, again in a split tubular form. FIG. 5c, on the other hand, is similar to FIG. 5a in that it has the ferrous metal split tubular member 26 but further incorporates a ferrous end plate 28, which has been found to further increase the sensitivity of the sensor, again by providing a more complete magnetic circuit with the magnetic pin 20.

Figure 6:
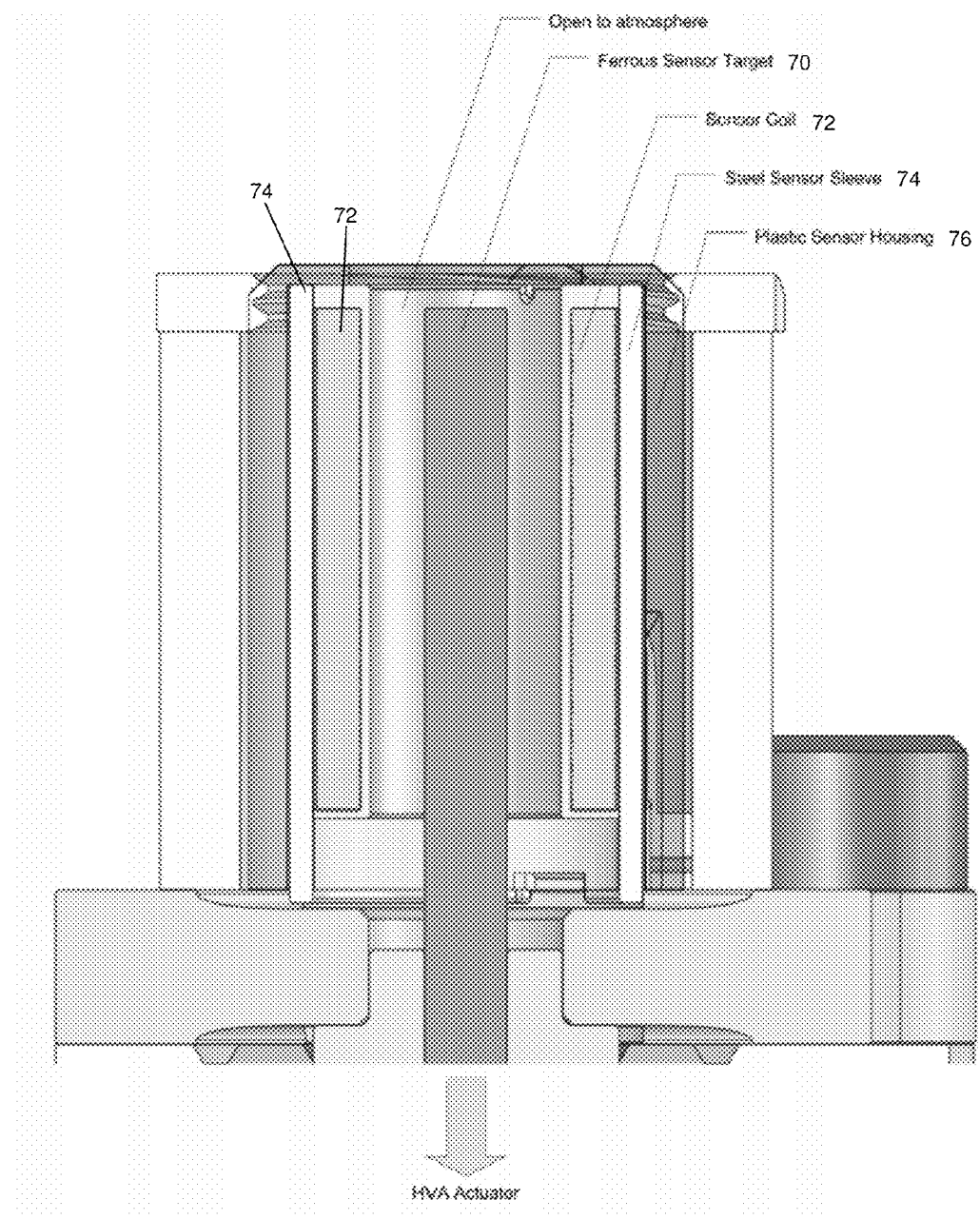
FIGS. 6 through 8 illustrate various implementations of the sensor of the present invention.
Figure 7:
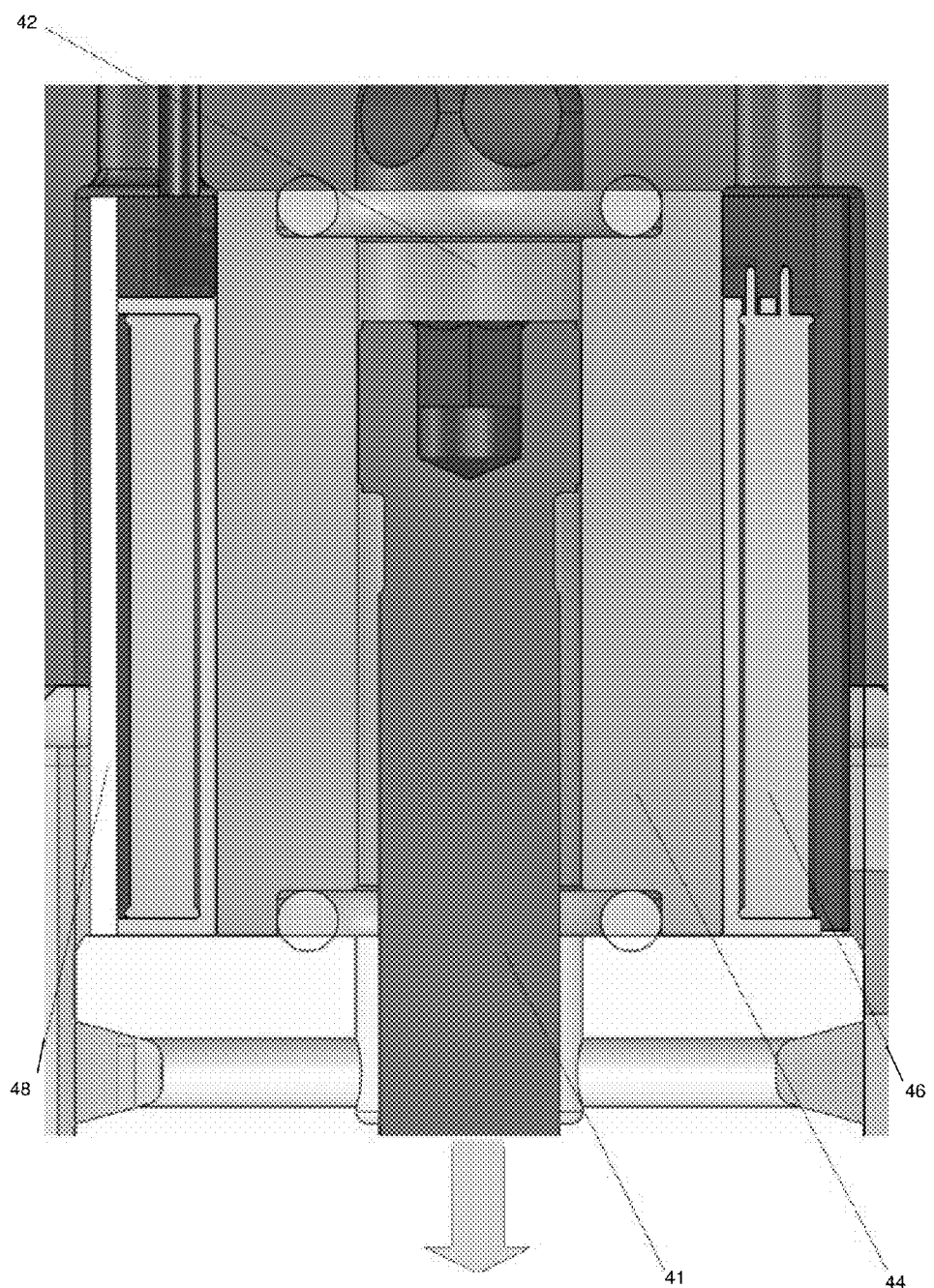
Figure 8:
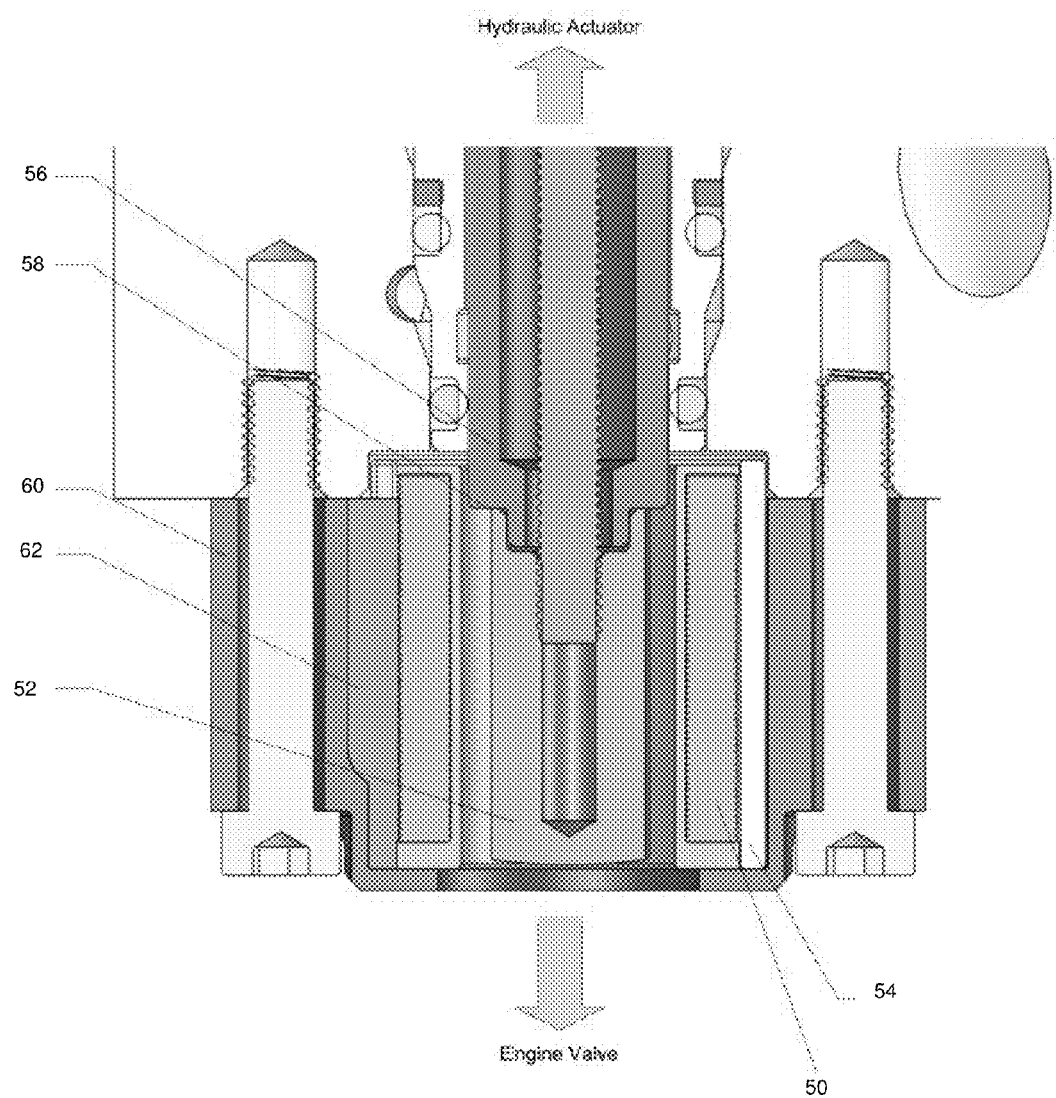

Now referring to FIGS. 6 through 8, various implementations of the sensor of the present invention may be seen. In this embodiment the target (magnetic pin) 70 is connected to the hydraulic valve actuation actuator therebelow, with the sensor coil 72 surrounding the target 70 with a steel or ferrous sleeve 74, again with a longitudinal slot therein, generally encircling the coil 72. In this embodiment a plastic housing 76 is used, with the top of the housing being open to the atmosphere. Thus this embodiment is an example of the application of the embodiment of FIG. 5a.

Now referring to FIG. 7, an embodiment incorporated within a hydraulic actuator for a hydraulic engine valve actuation system may be seen. Here the ferrous target 41 also acts as a hydraulic piston to open an engine valve in response to actuation fluid pressure in the region 42 above the target 41. The target 41 slides within a ceramic cylinder 44 with sensor coil 46 on a bobbin surrounding the ceramic member 44. The steel sensor sleeve 48 may be seen at one side of the cross section of the sensor assembly but not on the other side, as the cross section is taken through the slit in the steel sleeve 48.

In FIG. 8, the sensor is disposed between the top of an engine valve stem (not shown) and a hydraulic actuator for actuating the same (also not shown). The sensor coil 50 surrounds the ferrous metal target 52 with the split steel sensor sleeve 54 encircling the sensor coil 50. Member 56 is a non-ferrous (non-magnetic) metal with the intersection between the ferrous metal target 52 and the non-ferrous metal 56 being labeled 58. The entire assembly is retained within a plastic housing 60 with the steel sensor sleeve 54 being shown only on one side of the cross section of FIG. 8, as the cross section is taken through slit 62 in the steel sensor sleeve.

It should be noted that one can apply the principles of the present invention to other sensing circuitry as desired. By way of example, one could sense the voltage across the resistor R, and take the output as the time during which the voltage across the resistor does differs from the Excitation Signal by a predetermined voltage. One could also sense position using both a positive pulse and a negative pulse, though this is not preferred for reasons set forth herein, or using a negative pulse only, effectively an inversion of the embodiment disclosed. The key point is that one senses the inductance of the sense coil by sensing a time period responsive to the time period that the magnitude of the voltage across the sense coil exceeds to a predetermined value, whether sensed directly across the sense coil, or indirectly sensed by sensing the opposite voltage waveform across the resistor, given that the sum of the two voltages must equal the voltage step of the Excitation Signal.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A position sensor comprising:
   a coil;
   a magnetic target movable within the coil into greater and lesser proximity to the coil responsive to the position to be sensed; and
   circuitry coupled to the coil to apply a voltage pulse to a series combination of a resistor and the coil, and to sense a time period responsive to the time period that the magnitude of the voltage across the coil exceeds a predetermined value responsive to an inductance of the coil to provide a measure of the proximity of the magnetic target to the coil;
   reset circuitry to force the current in the coil to zero after the voltage pulse terminates.

2. The position sensor of claim 1 further comprising a magnetic sleeve surrounding the periphery of the coil, the magnetic sleeve having an opening along its length to interrupt Eddy currents around the magnetic sleeve.

3. The position sensor of claim 2 further comprising a magnetic member enclosing an end of the sleeve.

4. The position sensor of claim 1 wherein the coil and magnetic target are disposed above a hydraulic value actuator.

5. The position sensor of claim 4 further comprising a magnetic sleeve surrounding the periphery of the coil, the magnetic sleeve having an opening along its length to interrupt Eddy currents around the magnetic sleeve.

6. The position sensor of claim 1 wherein the coil and magnetic target are disposed between a hydraulic valve actuator and an engine valve.

7. The position sensor of claim 1 wherein the coil and magnetic target is a hydraulic piston for a hydraulic valve actuator.

8. The position sensor of claim 7 further comprising a magnetic sleeve surrounding the periphery of the coil, the magnetic sleeve having an opening along its length to interrupt Eddy currents around the magnetic sleeve.

9. A position sensor comprising:
   a coil in a form of a circular cylinder;
   a magnetic target movable within and along an axis of the coil into greater and lesser proximity to the coil responsive to the position to be sensed; and
   circuitry coupled to the coil to apply a voltage pulse to a series combination of a resistor and the coil, and to sense a time period responsive to the time period that the magnitude of the voltage across the coil exceeds a predetermined value responsive to an inductance of the coil to provide a measure of the proximity of the magnetic target to the coil;
   wherein after the voltage across the resistor has decayed to the predetermined value, the circuitry to apply the voltage pulse terminates the voltage pulse, and after a current in the coil decays to zero, repeats the voltage pulse and again senses when the voltage across the resistor has again increased to the predetermined value.

10. The position sensor of claim 9 further comprising a magnetic sleeve surrounding the periphery of the coil, the magnetic sleeve having an opening along its length to interrupt Eddy currents around the magnetic sleeve.

11. The position sensor of claim 10 further comprising a magnetic member enclosing an end of the sleeve.

12. The position sensor of claim 9 further comprised of reset circuitry to force the current in the coil to zero after the voltage pulse terminates.

13. A position sensor comprising:
   a cylindrical coil;
   a magnetic target movable within and along an axis of the coil into greater and lesser proximity to the coil responsive to the position to be sensed;
   a magnetic sleeve surrounding the periphery of the coil, the magnetic sleeve having an opening along its length to interrupt Eddy currents around the magnetic sleeve; and,
   circuitry coupled to the cylindrical coil and responsive to the inductance of the cylindrical coil to apply a voltage pulse to a series combination of a resistor and the cylindrical coil, and to sense a time period responsive to the time period that the magnitude of the voltage across the cylindrical coil exceeds a predetermined value responsive to an inductance of the cylindrical coil, and after the voltage across the resistor has decayed to the predetermined value, the circuitry to apply the voltage pulse terminates the voltage pulse, and after a current in the coil decays to zero, repeats the voltage pulse and again senses when the voltage across the resistor has again increased to the predetermined value; and reset circuitry to force the current in the cylindrical coil to zero after the voltage pulse terminates.

14. The position sensor of claim 13 further comprising a magnetic member enclosing an end of the sleeve.

\* \* \* \* \*